(12) United States Patent
Gadkaree et al.

(10) Patent No.: US 6,736,875 B2
(45) Date of Patent: May 18, 2004

(54) COMPOSITE CORDIERITE FILTERS

(75) Inventors: Kishor P. Gadkaree, Big Flats, NY (US); Yanxia Lu, Painted Post, NY (US); Joseph F. Mach, Lindley, NY (US); Christopher J. Warren, Waverly, NY (US); Yuming Xie, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 111 days.

(21) Appl. No.: 10/020,742

(22) Filed: Dec. 13, 2001

(65) Prior Publication Data

US 2003/0110744 A1 Jun. 19, 2003

(51) Int. Cl.[7] .................. B01D 39/20; C04B 35/195; C04B 35/515

(52) U.S. Cl. .................. 55/523; 55/282.3; 55/DIG. 30; 501/9; 501/87; 501/88; 501/96.1; 501/96.3; 501/96.4; 501/97.1; 428/116

(58) Field of Search ............................... 755/282.3, 523, 755/DIG. 10, DIG. 30; 501/6, 7, 8, 9, 87, 88, 92, 96.1, 96.3, 96.4, 97.1; 428/116; 502/439

(56) References Cited

U.S. PATENT DOCUMENTS

| | | | |
|---|---|---|---|
| 4,542,109 A | | 9/1985 | Pasto |
| 4,673,658 A | | 6/1987 | Gadkaree et al. |
| 4,776,866 A | | 10/1988 | Chen et al. |
| 4,853,350 A | | 8/1989 | Chen et al. |
| 4,855,259 A | * | 8/1989 | Claussen et al. ............ 501/9 |
| 5,023,215 A | * | 6/1991 | Cleveland ............... 501/97.4 |
| 5,132,257 A | | 7/1992 | Kodama et al. |
| 5,578,534 A | * | 11/1996 | Talmy et al. ............... 501/8 |
| 5,750,026 A | * | 5/1998 | Gadkaree et al. .......... 55/523 |
| 5,884,138 A | | 3/1999 | Chalasani et al. |

* cited by examiner

*Primary Examiner*—Duane Smith
*Assistant Examiner*—Jason M. Greene
(74) *Attorney, Agent, or Firm*—Anca C. Gheorghiu

(57) ABSTRACT

Composite cordierite honeycomb structures especially suitable for diesel exhaust filtration applications comprise a non-oxide polycrystalline phase constituting 10–70% by weight, with the remainder of the ceramic material constituting a cordierite phase, the non-oxide polycrystalline phase being selected from the group consisting of carbides, nitrides, and borides. Preferably the non-oxide phase is either polycrystalline silicon carbide or polycrystalline silicon nitride and has a particle aspect ratio of less than 3. Inventive ceramic bodies are porous with an open porosity of at least 30%, preferably between 40% and 60%, and a median pore size of at least 5 micrometers, more preferably greater than 8 micrometers and less than 12 micrometers.

34 Claims, 2 Drawing Sheets

COMPOSITE CORDIERITE FILTERS

BACKGROUND OF THE INVENTION

The present invention relates to multicellular honeycomb structures useful in applications of diesel engine exhaust filtration, and more particularly to porous ceramic filters of improved thermal conductivity and thermal shock resistance under conditions encountered in diesel exhaust systems.

Filters of diesel exhaust streams require a combination of high thermal shock resistance, excellent chemical and mechanical durability in harsh environments, and good filtration efficiency.

Cordierite monolith filters have been in use for heavy duty engine applications for nearly two decades. Benefits of these filters include minimal material and manufacturing costs. Recently, there has been an increase in demand of filters for passenger diesel cars due to tightening environmental pollution regulations. However, it appears that in passenger cars, especially under conditions of "uncontrolled" regeneration (i.e., where the onset of combustion coincides with, or is immediately followed by high oxygen content and low exhaust gas flow rates resulting in high temperature spikes) existing cordierite filters have shown tendency for failure. During an uncontrolled regeneration, the combustion of the soot (a reaction which is already highly exothermic) may produce temperature in the cordierite filter body of up to 1300° C.–1500° C. or even higher.

Even if the temperatures are not sufficient to damage the filter, they may be high enough to cause partial sintering to the surface of the filter walls of "ash" particles, which consist of oxides such as those of calcium, zinc, magnesium, phosphorus, and sulfur, that are carried by the exhaust gas from burning of the engine lubricating oil, and oxides of metals such as iron and cerium that may be present as additives to the diesel fuel to aid in combustion of the soot. Additionally, oxide particles of iron, copper, and zinc may be present from wear of the engine components. These particles are not combustible and, therefore, are not removed during regeneration. Such sintered ash deposits may be difficult or impossible to remove from the filter during periodic maintenance, resulting in (i) a decrease in pore size and porosity and an increase in back pressure and loss in soot loading capacity, and (ii) formation of eutectics from reaction with the filter material which lowers the melting point of the underlying ceramic material.

As an alternative to cordierite monolith filters, silicon carbide (SiC) filters have emerged as the preferred choice. Benefits of these filters reside in SiC's stable composition, high mechanical strength and high thermal conductivity. However, SiC also has high thermal expansion and poor thermal shock resistance which may result in cracking of the filter during regeneration cycles. Consequently, current SiC diesel particulate filters have to be designed in segmental configuration to minimize cracking during use, which translates into higher costs of manufacturing and production.

SUMMARY OF INVENTION

In view of the foregoing drawbacks in the prior art, an object of the present invention is to obviate the above-mentioned problems in diesel exhaust filters by providing a composite cordierite body of improved thermal and mechanical properties under conditions encountered in diesel exhaust systems. Cordierite ceramics provided in accordance with the invention may be made by conventional extrusion or other forming processes, so that ceramic products in any of the configurations presently utilized, but exhibiting improved thermal properties, may be provided.

Ceramic bodies provided in accordance with the invention comprise a non-oxide polycrystalline phase selected from the group consisting of carbides, nitrides and borides constituting 10–70% by weight of the body, and the remainder an oxide phase, preferably cordierite (magnesium aluminum silicate). Preferably, the non-oxide polycrystalline phase constitutes 10–50% by weight of the body, and more preferably 10–30% by weight of the body, is selected from the group consisting of polycrystalline silicon carbide and polycrystalline silicon nitride and has a particle aspect ratio of less than 3. In addition to cordierite, other suitable oxide phases include alkali aluminum silicates, such as lithium aluminum silicate and potassium aluminum silicate, alkaline earth aluminum silicates, such as calcium aluminum silicate and barium aluminum silicate.

Inventive structures are porous with an open porosity of at least 30%, preferably between 40% and 60%, and a mean a median pore size of at least 5 micrometers, preferably between 6 and 30 micrometers, and more preferably between 8 and 12 micrometers.

The inventive structures further exhibit a mean coefficient of thermal expansion from 22–1000° C. of about 20–45× $10^{-7}/°$ C., and a four-point modulus of rupture as measured on a cellular bar of at least about 300 pounds per square inch (psi), preferably at least about 700 psi, and more preferably at least about 1000 psi.

The manufacture of a composite cordierite ceramic body in accordance with the invention comprises first providing a ceramic batch compounded from source materials for the cordierite phase and the non-oxide phase. For the cordierite phase suitable sources include reuse cordierite powder and conventional raw material comprising source material for $MgO$, $Al_2O_3$, and $SiO_2$. For the non-oxide phase suitable sources include powdered silicon carbide and powdered silicon nitride. The batch is compounded in proportions which will yield, after firing, a mixed cordierite-non-oxide composition.

The compounded batch is next shaped into a green body, preferably a multicellular honeycomb structure, by a suitable ceramic forming process, preferably extrusion. In a preferred embodiment, the batch is blended with a suitable vehicle to form a plasticized mixture, and this mixture is formed into a green body by extrusion and optionally drying.

The resulting green body is next fired in air to temperatures of 1000° C.–1500° C., preferably between about 1200° C.–1400° C., with a soak time in that temperature range of a duration sufficient to form a sintered body, the soak time being preferably about 1 to 10 hours, more preferably 2 to 6 hours.

Composite cordierite bodies provided in accordance with the present invention are especially suited in applications of filtering diesel exhaust.

DETAILED DESCRIPTION OF THE INVENTION

Figure 1:
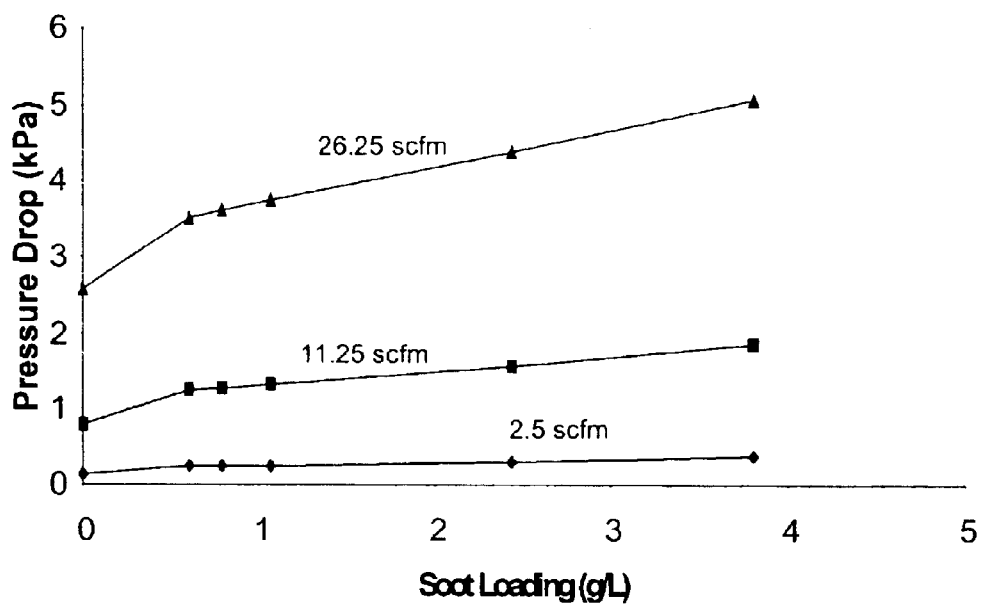
FIG. 1 is a graphic illustration of the pressure drop in units of KPa as a function of soot loading in units of g/L for Example II-5.

Filters of the type herein described are referred to as "wall flow" filters since the flow paths resulting from alternate channel plugging require the exhaust being treated to flow through the porous ceramic cell walls prior to exiting the filter. For diesel particulate filtration, honeycomb structures having cellular densities between about 10 and 400 cells/in$^2$ (about 1.5 to 62.0 cells/cm$^2$), more typically between about 100 and 200 cells/in$^2$ (about 15.5 to 31 cells/cm$^2$), are considered useful to provide sufficient thin wall surface area in a compact structure. Wall thickness can vary upwards from the minimum dimension providing structural integrity of about 0.010 in. (about 0.25 mm.), but are generally less than about 0.030 in. (0.76 mm.) to minimize backpressure against the engine.

Products provided in accordance with the invention comprise a composite ceramic including a non-oxide polycrystalline phase selected from the group consisting of carbides, nitrides and borides constituting 10–70% by weight of the body, with the remainder being a polycrystalline oxide phase. Suitable oxide phases include alkali aluminum silicates, such as lithium aluminum silicate and potassium aluminum silicate, alkaline earth aluminum silicates, such as magnesium aluminum silicate, calcium aluminum silicate and barium aluminum silicate.

In a preferred embodiment the inventive structures comprise a non-oxide phase selected from the group consisting of polycrystalline silicon carbide (SiC) and polycrystalline silicon nitride ($Si_3N_4$) and constituting 10–50% by weight of the body, and more preferably 10–30% by weight of the body, with the remainder of the ceramic material constituting the oxide phase, that being cordierite (magnesium aluminum silicate). Preferably, the polycrystalline silicon carbide or silicon nitride phase have a particle aspect ratio (length/diameter) of less than 3.

The composition of the cordierite oxide phase is close to that of $Mg_2Al_4Si_5O_{18}$; however, limited substitution of other constituents such as Fe (iron), Co (cobalt), Ni (nickel), and Mn (manganese) for the Mg (magnesium), Ga (gallium) for the Al (aluminum), and Ge (germanium) for the Si (silicon) is acceptable. Also, the cordierite phase may contain up to three atoms of an alkali (Group IA) metal, two atoms of an alkaline earth metal (Group IIA), or one atom of a rare earth metal (scandium, yttrium, or a lanthanide metal) per 54 oxygens. These substituents would be expected to occupy the normally vacant "channel sites" in the crystal structure of the cordierite phase, although their limited substitution for Mg might also occur. Incorporation of these elements into the cordierite crystal structure may be coupled with other chemical substitutions, such as a change in Al/Si ratio, to preserve charge balance.

An advantage of the present invention is expected to reside in a reduction in peak filter temperatures encountered by diesel particulate filters during regeneration. For purposes of the present invention the term "peak filter temperature" refers to the maximum temperatures reached within the filter during regeneration. The peak filter temperature is significantly reduced in the inventive filters in comparison to conventional cordierite filters under conditions encountered in diesel exhaust systems. This advantage is secured by the addition of the non-oxide phase to the cordierite oxide phase, the non-oxide phase resulting in an increase in the thermal conductivity of the filter, without sacrifice of the oxide properties including mechanical strength, pore structure, thermal expansion and chemical stability.

As carbon soot from the exhaust accumulates or builds up on the cell walls, it must be burned off to maintain filter function. Ignition of the carbon soot may occur when a sufficient temperature is reached in the exhaust stream or by adding fuel to raise the temperature of the carbon soot sufficiently for a sustained combustion. The temperature, however, is not uniform during the regeneration process. The peak filter temperature of the structure depends most strongly on the thermal conductivity of the ceramic material. Cordierite has a low thermal conductivity. As a result, heat accumulates in cordierite filters to temperatures surpassing its melting point.

Conversely, non-oxide materials such as silicon carbide and silicon nitride have a high thermal conductivity resulting is good thermal diffusivity. It has been found, that by adding a non-oxide phase such as silicon carbide or silicon nitride in an amount of about 10–70% by weight of the body, preferably 10–50% by weight of the body, and more preferably 10–30% by weight of the body, the resulting composite filter has increased thermal conductivity and thermal response, and therefore improved thermal shock resistance without sacrifice of advantageous oxide properties such as pore structure, low thermal expansion and chemical stability.

Diesel particulate filters having a low pressure drop across the length of the filer and lowered back pressure against the engine have been presently achieved. Additionally, inventive structures exhibit good open porosity, median pore sizes, permeability and mean coefficients of thermal expansion. Accordingly, it is preferred for diesel exhaust filtration applications to have an open porosity of at least 30%, preferably between 40% and 60%, and a mean a median pore size of at least 5 micrometers, preferably between 6 and 30 micrometers, and more preferably between 8 and 12 micrometers.

The inventive structures also exhibit a mean coefficient of thermal expansion from 22–1000° C. of about 20–45×10$^{-7}$/° C., and a four-point modulus of rupture as measured on a cellular bar of at least about 300 pounds per square inch (psi), preferably at least about 700 psi, and more preferably at least about 1000 psi.

Raw materials for ceramic batches useful in the production of present ceramic products may be selected from any suitable source. In the preferred embodiment of the present invention, raw materials for the production of cordierite ceramic bodies are clay, talc, and alumina, with the clays typically constituting kaolinitic clays of a platey rather than stacked habit. Suitable cordierite-forming raw material mixtures are provided in U.S. Pat. No. 3,905,175 herein incorporated by reference in its entirety.

In addition to cordierite-forming raw materials, another suitable cordierite source is reuse cordierite powder. "Reuse cordierite powder" refers to material which is composed predominately of a cordierite-type phase formed from cordierite-forming raw materials of the type described herein above. Often in the production of commercially available cordierite ceramic products, surplus material from rejected parts remains. This material referred to in the industry as "reuse" is suitable in the present invention as a cordierite source after undergoing grinding to a powder with a median particle size of about 10 to 50 micrometers.

To form the non-oxide phase suitable sources include particulate polycrystalline silicon carbide and silicon nitride, preferably having a median particle size of about 5 to 30 micrometers.

The powdered raw materials are dry mixed together. When cordierite-forming raw materials are used as the source of the cordierite phase, the raw materials are in quantities yielding the proportions of MgO, $Al_2O_3$ and $SiO_2$ required for cordierite formation in the final product. The dry mixture may then be formed into honeycomb structures by extrusion. A batch mixture suitable for extrusion can be prepared by mixing the dry batch with a suitable liquid vehicle. The vehicle may comprise water and extrusion aids necessary to give the batch plastic formability and sufficient green strength after forming to resist breakage prior to firing.

The extrusion aids will normally comprise both binders and plasticizers; methyl cellulose is an example of which is currently used. Batches of this type, which generally contain 25–35% water, are sufficiently plastic so that they can be readily formed by extrusion into honeycomb structures. The mixture may also contain a pore former such as graphite or polyethylene beads to control the porosity of the fired product.

The firing procedure used in the present invention is similar to conventional firing processes for cordierite ceramics. Specifically, firing the green ceramic structures in air to temperatures in the range of about 1000° C.–1500° C, preferably between about 1200° C.–1400° C., with a soak time in that temperature range of a duration sufficient to complete sintering or crystallization of the body, depending on the source of cordierite employed, the soak time being preferably about 1 to 10 hours, more preferably 3 to 6 hours.

The so-formed honeycomb structures are preferably plugged at a portion of the inlet end cell channels and at a portion of the outlet end cell channels but not corresponding to those at the inlet end, such that each cell is plugged at one end only. The plugging is only at the ends of the cell channels which is typically to a depth of about 5 to 20 mm, although this can vary. The preferred arrangement is to have every other cell channel on a give end plugged in a checkered pattern.

The invention may be further understood by reference to the following Examples, which are intended to be merely illustrative of the presently preferred method for carrying out the invention.

EXAMPLES

Tables I and II provide batching and properties information on examples of the present invention. Mixtures were made with powdered reuse cordierite, cordierite-forming raw material powders, and powdered polycrystalline silicon carbide. Methyl cellulose was added as a binder, sodium stearate was added as a lubricant and graphite or polyethylene beads were used as pore formers. All dry raw materials, including binder, lubricant and pore former, were weighed into a container and dry mixed without milling media to provide some homogenization on a macroscopic scale. The mixtures were then transferred into a stainless steel muller to which distilled water was gradually added in a quantity sufficient to impart plasticity to the mixture. The mixture was then extruded into honeycomb cellular bodies having about 200 cells per square inch (31 cells/cm$^2$), and having a wall thickness of about 0.010 to 0.023 inches (0.025 to 0.058 cm).

The extruded cellular bodies were next optionally dried and then fired in air to maximum temperatures of 1150–1300° C. and held there for 2 to 5 hours to form the final product structure. The structures were plugged as described previously and then evaluated for physical properties.

Percent porosity, and median pore diameter were determined by mercury porosimetry. Mean coefficients of thermal expansion (CTE) from 22° to 1000° C. (expressed in units of ° C.$^{-1}$) were measured using a dilatometer. The phase assemblage for selected examples was identified by powder x-ray diffractometry. The modulus of rupture (MOR) in pounds per square inch (psi) was measured on both solid rods of circular cross section (Table I) and cellular bars (Table II) as known in the art. It is noted that MOR data from solid rods may be correlated to MOR data measured on cellular bars in that generally MOR (cellular bar) is about ½ MOR (solid rod).

Referring now to FIG. 1 therein illustrated is a graph of pressure drop in units of kPa as a function of soot loading in units of g/L for Example II-5, a diesel particulate filter made according to the present invention and having a cell density of 200 cells/in2 (31 cells/cm2), a wall thickness of 0.023 in (0.058 cm), and dimensions of 2 inches in diameter and 6 inches in length. The inventive filter exhibits excellent pressure drop performance for all three flow rates of 2.5 standard cubic feet per minute (scfm), 11.25 scfm, and 26.25 scfm. The maximum observed temperatures during regeneration at soot loading levels of 12 grams/liter, 13.5 grams/liter, and 16.6 grams/liter were 934° C., 952° C. and 1090° C., respectively for this filter, were well below the levels usually observed with commercially available cordierite filters. The inventive filter also exhibited a filtration efficiency of 99.7%.

Figure 2:
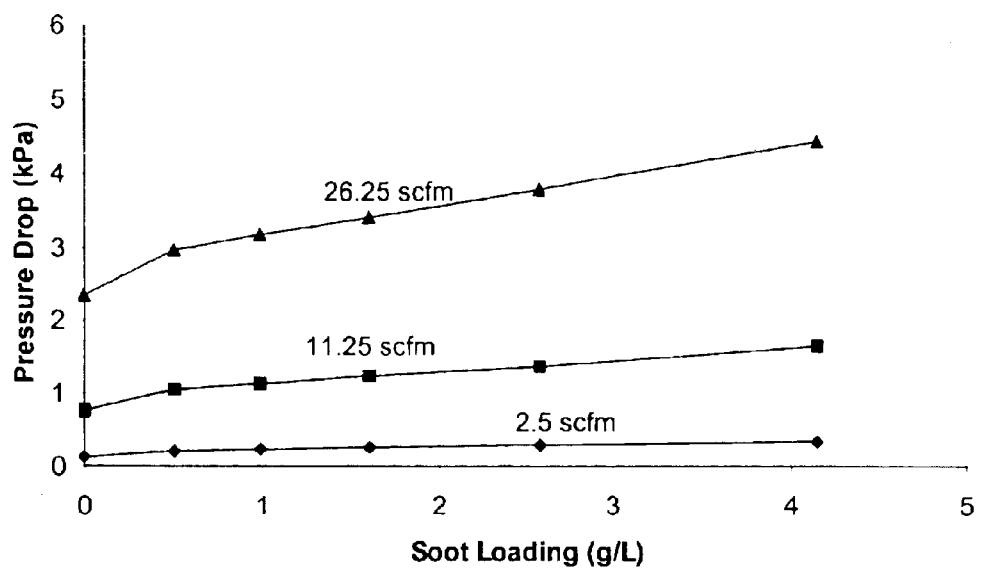
FIG. 2 is a graphic illustration of the pressure drop in units of KPa as a function of soot loading in units of g/L for Example II-6.

Referring now to FIG. 2 therein illustrated is a graph of pressure drop as a function of soot loading for Example III-2, a diesel particulate filter made according to the present invention and having a cell density of 200 cells/in2 (31 cells/cm2), a wall thickness of 0.023 in (0.058 cm), and dimensions of 2 inches in diameter and 6 inches in length. The inventive filter exhibits excellent pressure drop performance for all three flow rates of 2.5 scfm, 11.25 scfm, and 26.25 scfm. The maximum observed temperatures during regeneration at soot loading levels of 9.93 grams/liter, and 15.7 grams/liter were 813° C. and 1083° C., respectively for this filter, well below the levels usually observed with commercially available cordierite filters. The inventive filter also exhibited a filtration efficiency of 98.9%.

TABLE 1

| Example Number | I-1 | I-2 | I-3 | I-4 | I-5 |
|---|---|---|---|---|---|
| Weight Percentages of Raw Materials | | | | | |
| Powdered Reuse Cordierite | 73.5 | 68.9 | 64.3 | 68.9 | 68.9 |
| Cordierite-forming Raw Materials Mixture | — | — | — | — | — |
| Silicon Carbide | 18.4 | 23.0 | 27.6 | — | 23.0 |
| Silicon Nitride | — | — | — | 23.0 | — |
| Particle Size Distribution (micrometers) | | | | | |
| Median Particle Size of Powdered Cordierite | 32 | 32 | 32 | 32 | 32 |
| Median Particle Size of Cordierite-forming Raw Materials Mixture | — | — | — | — | — |
| Median Particle Size of Silicon Carbide | 11 | 11 | 11 | — | 11 |
| Median Particle Size of Silicon Nitride | — | — | — | 24 | — |
| Pore Forming Agent (weight %) | | | | | |
| Polyethylene Beads | — | — | — | — | — |
| Graphite | — | — | — | — | — |
| Binder, Lubricant, and Solvents (weight %) | | | | | |
| Methylcellulose | 7.4 | 7.4 | 7.4 | 7.4 | 7.4 |
| Sodium stearate | 0.7 | 0.7 | 0.7 | 0.7 | 0.7 |
| Water | 23.6 | 24.6 | 24.3 | 27.7 | 24.9 |
| Firing Conditions | | | | | |
| Atmosphere | Air | Air | Air | Air | Air |
| Maximum Temperature (° C.) | 1250 | 1250 | 1250 | 1250 | 1250 |
| Hold Time (hours) | 4 | 4 | 4 | 4 | 4 |

TABLE 1-continued

| Example Number | I-1 | I-2 | I-3 | I-4 | I-5 |
|---|---|---|---|---|---|
| Properties of Fired Ware | | | | | |
| Modulus of Rupture (solid rod) (psi) | 1129 | 920 | 1314 | 459 | 1179 |
| Open Porosity (%) | 39.3 | 44.4 | 43.8 | 50 | 58.4 |
| Median Pore Diameter (micrometers) | 5.5 | 5.5 | 5.1 | 6.8 | 7.9 |
| Permeability ($10^{-12}$ m$^2$) | 0.26 | 0.3 | 0.22 | 0.42 | 0.35 |
| Mean CTE from 22 to 1000° C. ($10^{-7}$/° C.) | 27.7 | 24.1 | 33 | 23.1 | 30 |
| Weight percent Silicon Carbide in final structure | 20 | 25 | 30 | — | 25 |
| Weight percent Silicon Nitride in final structure | — | — | — | 25 | — |

TABLE II

| Example Number | II-1 | II-2 | II-3 | II-4 | II-5 | II-6 |
|---|---|---|---|---|---|---|
| Weight Percentages of Raw Materials | | | | | | |
| Powdered Reuse Cordierite | 61.0 | 48.0 | — | 20.0 | 46.0 | 46.0 |
| Cordierite-forming Raw Materials Mixture | — | — | 43.0 | — | — | — |
| Silicon Carbide | 27.0 | 35.0 | 40.0 | 63.0 | 42.0 | 42.0 |
| Silicon Nitride | | | | | | |
| Particle Size Distribution (micrometers) | | | | | | |
| Median Particle Size of Powdered Cordierite | — | — | — | — | — | — |
| Median Particle Size of Cordierite-forming Raw Materials Mixture | — | — | — | — | — | — |
| Median Particle Size of Silicon Carbide | 20 | 40 | 20 | 20 | 40 | 20 |
| Median Particle Size of Silicon Nitride | | | | | | |
| Pore Forming Agent (weight %) | | | | | | |
| Polyethylene Beads | — | 10 | 10 | — | 5 | 5 |
| Graphite | — | — | — | 10 | — | — |
| Binder, Lubricant, and Solvents (weight %) | | | | | | |
| Methylcellulose | 6 | 6 | 6 | 6 | 6 | 6 |
| Sodium stearate | 1 | 1 | 1 | 1 | 1 | 1 |
| Water | 28 | 30 | 30 | 25 | 30 | 30 |
| Firing Conditions | | | | | | |
| Atmosphere | Air | Air | Air | Air | Air | Air |
| Maximum Temperature (° C.) | 1300 | 1300 | 1300 | 1300 | 1300 | 1300 |
| Hold Time (hours) | 5 | 5 | 5 | 5 | 5 | 5 |
| Properties of Fired Ware | | | | | | |
| Modulus of Rupture (cellular bar) (psi) | 1045 | 750 | 1065 | — | 950 | — |
| Open Porosity (%) | 45 | 49 | 50 | 54 | 50 | — |
| Median Pore Diameter (micrometers) | 7.49 | 9.2 | 6.65 | 9.0 | 13.0 | — |
| Permeability ($10^{-12}$ m$^2$) | — | — | — | — | — | — |
| Mean CTE from 22 to 1000° C. ($10^{-7}$/° C.) | 22.8 | 30.0 | — | — | 33.0 | — |

It is claimed:

1. A multicellular honeycomb structure composed of a ceramic material comprising a non-oxide polycrystalline phase constituting 10–70% by weight, with the remainder of the ceramic material constituting a cordierite phase, the non-oxide polycrystalline phase being selected from the group consisting of carbides, nitrides, and borides, wherein the non-oxide polycrystalline phase has a particle aspect ratio of less than 3, wherein the ceramic material has an open porosity of at least 30% and a median pore size of at least 5 micrometers.

2. The honeycomb of claim 1 wherein the non-oxide polycrystalline phase is selected from the group consisting of polycrystalline silicon carbide and polycrystalline silicon nitride.

3. The honeycomb of claim 2 wherein the non-oxide polycrystalline phase constitutes 10–50% by weight of the ceramic material.

4. The honeycomb of claim 3 wherein the non-oxide polycrystalline phase constitutes 10–30% by weight of the ceramic material.

5. The honeycomb of claim 1 wherein the non-oxide polycrystalline phase is polycrystalline silicon carbide.

6. The honeycomb of claim 1 wherein the non-oxide phase is polycrystalline silicon nitride.

7. The honeycomb of claim 1 wherein the porosity is between 40% and 60%.

8. The honeycomb of claim 1 wherein the median pore size is between 8 micrometers and 12 micrometers.

9. A filter for trapping and combusting diesel exhaust particulates comprising a wall-flow honeycomb body composed of a porous ceramic material and having a plurality of parallel end-plugged cell channels traversing the body from a frontal inlet end to an outlet end thereof, wherein the ceramic material comprises a non-oxide polycrystalline phase constituting 10–70% by weight, with the remainder of the ceramic material constituting a cordierite phase, the non-oxide polycrystalline phase being selected from the group consisting of carbides, nitrides, and borides, wherein the filter has an open porosity of at least 30% and a median pore size of at least 5 micrometers.

10. The filter of claim 9 wherein the porosity is between 40% and 60%.

11. The filter of claim 10 wherein the median pore size is between 8 micrometers and 12 micrometers.

12. The filter of claim 11 wherein the non-oxide polycrystalline phase is selected from the group consisting of polycrystalline silicon carbide and polycrystalline silicon nitride.

13. The filter of claim 12 wherein the non-oxide polycrystalline phase constitutes 10–50% by weight of the ceramic material.

14. The filter of claim 13 wherein the non-oxide polycrystalline phase constitutes 10–30% by weight of the ceramic material.

15. The filter of claim 14 wherein the non-oxide phase is polycrystalline silicon carbide.

16. The filter of claim 14 wherein the non-oxide phase is polycrystalline silicon nitride.

17. The filter of claim 9 wherein the non-oxide phase has a particle aspect ratio of less than 3.

18. A filter according to claim 9 exhibiting a mean coefficient of thermal expansion of between $20\text{--}45\times10^{-7}/^\circ$ C.

19. A filter according to claim 18 exhibiting a four-point modulus of rupture as measured on a cellular bar of at least about 300 pounds per square inch (psi).

20. The filter of claim 19 wherein the four-point modulus of rupture is at least about 700 psi.

21. The filter of claim 20 wherein the modulus of rupture is at least about 1000 psi.

22. A diesel exhaust particulate filter comprising a plugged, wall-flow honeycomb filter body composed of porous ceramic material and comprising a plurality of parallel end-plugged cell channels traversing the body from a frontal inlet end to an outlet end thereof, wherein:

the honeycomb body is composed of a composite ceramic having a non-oxide polycrystalline phase selected from the group consisting of carbide, nitrides and borides, the non-oxide polycrystalline phase constituting 10–70% by weight of the ceramic, the remainder being an oxide phase selected from the group consisting of alkali aluminum silicates and alkaline earth aluminum silicates, the diesel exhaust particulate filter being characterized by an open porosity of at least 30%, a median pore size of at least 5 micrometers, a mean coefficient of thermal expansion of between $20\text{--}45\times10^{-7}/^\circ$ C., and a modulus of rupture as measured on a cellular bar of at least about 300 pounds per square inch (psi).

23. The diesel exhaust particulate filter of claim 22 wherein the non-oxide polycrystalline phase is selected from the group consisting of polycrystalline silicon carbide and polycrystalline silicon nitride.

24. The diesel exhaust particulate filter of claim 23 wherein the non-oxide polycrystalline phase constitutes 10–50% by weight.

25. The diesel exhaust particulate filter of claim 24 wherein the non-oxide polycrystalline phase constitutes 10–30% by weight.

26. The diesel exhaust particulate filter of claim 22 wherein the oxide phase is alkali aluminum silicate selected from the group consisting of lithium aluminum silicate and potassium aluminum silicate.

27. The diesel exhaust particulate filter of claim 22 wherein the oxide phase is alkaline earth aluminum silicate selected from the group consisting of calcium aluminum silicate and barium aluminum silicate.

28. The diesel exhaust particulate filter of claim 23 wherein the porosity is between 40% and 60%.

29. The diesel exhaust particulate filter of claim 28 wherein the median pore size is between 8 micrometers and 12 micrometers.

30. The diesel exhaust particulate filter of claim 29 wherein the non-oxide polycrystalline phase is polycrystalline silicon carbide.

31. The diesel exhaust particulate filter of claim 29 wherein the non-oxide polycrystalline phase is polycrystalline silicon nitride.

32. The diesel exhaust particulate filter of claim 25 wherein the non-oxide polycrystalline phase has a particle aspect ratio of less than 3.

33. The diesel exhaust particulate filter of claim 23 wherein the four-point modulus of rupture is at least about 700 psi.

34. The diesel exhaust particulate filter of claim 33 wherein the modulus of rupture is at least about 1000 psi.

* * * * *